(12) United States Patent
Gross et al.

(10) Patent No.: US 8,395,816 B2
(45) Date of Patent: Mar. 12, 2013

(54) SYSTEM AND METHOD FOR GRADUALLY ADJUSTING A LOOK-UP TABLE FOR A PRINT ENGINE IN ORDER TO IMPROVE THE REGULATION OF COLOR QUALITY OF PRINTED IMAGES

(75) Inventors: Eric M. Gross, Rochester, NY (US); Song-Feng Mo, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 374 days.

(21) Appl. No.: 12/848,115

(22) Filed: Jul. 31, 2010

(65) Prior Publication Data
US 2012/0026517 A1 Feb. 2, 2012

(51) Int. Cl.
G06F 15/00 (2006.01)
G06K 1/00 (2006.01)
H04N 1/60 (2006.01)
H04N 1/40 (2006.01)

(52) U.S. Cl. ........................................ 358/1.9; 358/3.23
(58) Field of Classification Search .................. None
See application file for complete search history.

(56) References Cited

U.S. PATENT DOCUMENTS

| | | | |
|---|---|---|---|
| 5,347,369 A | 9/1994 | Harrington | |
| 5,748,330 A | 5/1998 | Wang et al. | |
| 6,694,109 B1 | 2/2004 | Donaldson et al. | |
| 7,147,025 B2 * | 12/2006 | Kitora | 152/415 |
| 7,239,819 B2 | 7/2007 | Gross et al. | |
| 7,291,399 B2 | 11/2007 | Kaplan et al. | |
| 2009/0153911 A1 | 6/2009 | He et al. | |
| 2010/0054769 A1 | 3/2010 | Adiletta et al. | |
| 2010/0183220 A1 * | 7/2010 | Monga et al. | 382/165 |

* cited by examiner

Primary Examiner — Douglas Tran
(74) Attorney, Agent, or Firm — Gibb & Riley, LLC

(57) ABSTRACT

Disclosed is a system and method for gradually adjusting a look-up table (LUT) for a print engine in order to improve the regulation of color quality of printed images. The LUT is updated so that a target value for a particular color is achieved. This corrects for a measured or predicted change in a tone reproduction curve. Depending upon the severity of the required adjustment, a series of incremental adjustments rather than a single adjustment can be made to the LUT table over a period of time. Each adjustment in the series can be limited to a predetermined maximum delta so that any corrections made to the LUT following the generation and evaluation of one test image and before the generation and evaluation of the next test image for the same target color are gradually and imperceptibly implemented (i.e., unnoticeable).

21 Claims, 10 Drawing Sheets

_121_

LOOK-UP TABLE

| Target Values For A Color: | Digital Area Coverage Values: |
|---|---|
| 100 | 0 |
| ⋮ | ⋮ |
| 75 | 100 |
| ⋮ | ⋮ |
| 50 | 125 |
| ⋮ | ⋮ |
| 0 | 255 |

*FIG. 3*

| Adjustment No. In Series | Target Value For A Color: Target Tone Value in L* Units | Adjusted Digital Area Coverage (E.g., Halftone Dot Area Coverage Level) Based on Actual Value of Color in Test Image #1 |
|---|---|---|
| 1 | 75 | 101 |
| 2 | 75 | 102 |
| 3 | 75 | 103 |
| 4 | 75 | 104 |
| 5 | 75 | 105 |
| 6 | 75 | 106 |
| 7 | 75 | 107 |
| 8 | 75 | 108 |
| 9 | 75 | 109 |
| 10 | 75 | *110 |

* Final Adjusted Digital Input Value

FIG. 6

| Adjustment No. In Series | Target Value For A Color: Target Tone Value in L* Units | Adjusted Digital Area Coverage (E.g., Halftone Dot Area Coverage Level) Based on Predicted Value for Color in Test Image #2 |
|---|---|---|
| 1 | 75 | 102 |
| 2 | 75 | 104 |
| 3 | 75 | 106 |
| 4 | 75 | 108 |
| 5 | 75 | 110 |
| 6 | 75 | 112 |
| 7 | 75 | 114 |
| 8 | 75 | 116 |
| 9 | 75 | 118 |
| 10 | 75 | *120 |

* Final Adjusted Digital Input Value

FIG. 7

SYSTEM AND METHOD FOR GRADUALLY ADJUSTING A LOOK-UP TABLE FOR A PRINT ENGINE IN ORDER TO IMPROVE THE REGULATION OF COLOR QUALITY OF PRINTED IMAGES

BACKGROUND

Embodiments herein generally relate to printing systems (e.g., electrostatographic printing systems) and associated printing methods. More particularly, the embodiments relate to a system and a method for gradually adjusting a look-up table (LUT) for a print engine in order to improve the regulation of color quality of printed images.

Generally, in order to print an image having a desired color a printing system will use a look-up table (LUT) that is representative of a tone reproduction curve for its print engine. Such an LUT is unique to the print engine and correlates target values for a color (e.g., target tone values) with digital input values (e.g., halftone dot area coverage amounts expressed, for example, in terms of levels, ratios or percentages) that will achieve those target values. Unfortunately, with time and use, the tone reproduction curve drifts causing the LUT to become less accurate such that the digital input values no longer achieve the target values. Changes in the tone reproduction curve are typically monitored by periodically generating and evaluating test images (i.e., test patches) to identify differences between target values for a particular color and actually achieved values. Once identified, various different techniques can be used alone and/or in combination to compensate for these differences. For example, various physical actuators within the printing system may be selectively adjusted in order to alter specific printing parameters, such as developer bias, charge level, etc. and, thereby to compensate for changes to the tone reproduction curve. Additionally or alternatively, the LUT for the tone reproduction curve can be updated. However, when there is a significant difference between a target value for a color and the actually achieved value, as is often the case when there is an extended period of time between monitoring operations, the above-described compensation techniques can result in a sudden and visually perceivable (i.e., noticeable) color correction. Such visually perceivable or noticeable color corrections are generally objectionable to customers, particularly, if they occur mid-image or mid-document.

The following documents, which are all assigned to Xerox Corporation of Norwalk, Conn., USA, relate to the regulation of color quality in printed images and are incorporated herein in their entirety by reference: U.S. Pat. No. 5,347,369 issued to Harrington on Sep. 13, 1994; U.S. Pat. No. 5,748,330 issued to Wang et al. on May 5, 1998; U.S. Pat. No. 6,694,109 issued to Donaldson et al. on Feb. 17, 2004; U.S. Pat. No. 7,239,819 issued to Gross et al. on Jul. 3, 2007; U.S. Patent Application Publication No. 2009/0153911 filed by He et al. on Jun. 18, 2009; and U.S. Patent Application Publication No. 2010/0054769 filed by Adiletta et al. on Jul. 15, 2009.

SUMMARY

In view of the foregoing, disclosed herein are embodiments of a system and a method for gradually adjusting a look-up table (LUT) for a print engine in order to improve the regulation of color quality of printed images. Specifically, the embodiments can update an LUT for a print engine so that a target value for a particular color (e.g., a target tone value) is correlated in the LUT with an adjusted digital input value (e.g., an adjusted halftone dot area coverage amount) that corrects for a detected or predicted change in a tone reproduction curve. However, depending upon the size of the required adjustment, a series of relatively small incremental adjustments can be made to the LUT over a specified period of time rather than a single relatively large adjustment. Each incremental adjustment in the series can be limited to a predetermined maximum delta in order to ensure that any adjustments that are made to the LUT are gradually and imperceptibly implemented (i.e., unnoticeable). Additionally, these adjustments can be made according to a predetermined schedule in order to avoid mid-image color corrections, mid-document color corrections, and/or mid-print job color corrections.

More particularly, disclosed herein are embodiments of a system for gradually adjusting a look-up table (LUT) for a print engine in order to improve the regulation of color quality of printed images. These system embodiments can comprise a print engine, a data storage device, an optical sensor (e.g., a spectrophotometer and a densitometer), and a processor. The data storage device can store a look-up table (LUT) that is representative of a print engine tone reproduction curve and that correlates target values for a particular color (e.g., target tone values) with digital input values (e.g., halftone dot area coverage amounts) required to achieve the target values. The print engine can generate a test image based on a selected digital input value from the LUT in an attempt to achieve a corresponding target value for the color. The optical sensor can evaluate the test image to determine the actual value of the color as printed in the test image (e.g., the actual tone value). Then, the processor can update the LUT based on the results from the optical sensor.

For example, in one embodiment, the processor can determine the difference between the actual value of the color in the test image and the corresponding target value for the color, which was correlated in the LUT with the selected digital input value and which was used to generate the test image. The processor can then update the LUT so that the corresponding target value for the color is instead correlated in the LUT with an adjusted digital input value that corrects for this difference. Depending upon the size of the required adjustment, the processor can update the LUT by making a series of relatively small incremental adjustments to the selected digital input value in order to achieve the adjusted digital input value.

In another embodiment, rather than updating the LUT based on the difference between the actual value of the color in the test image and the corresponding target value for the color, the processor can update the LUT based on the difference between a predicted value for the color at a future time and the corresponding target value for the color. Specifically, in this system embodiment, the data storage device can also store historical information characterizing time-dependent changes in the tone reproduction curve. Then, based on this historical information as well as the actual value of the color in the current test image, the processor can determine a predicted value for the color in the next test image to be generated based on the same selected digital input value. The processor can then determine the difference between this predicted value for the color and the corresponding target value for the color and update the LUT so that the corresponding target value is instead correlated in the LUT with an adjusted digital input value that corrects for this difference. As with the previously described embodiment, depending upon the size of the required adjustment, the processor can update the LUT by making a series of relatively small incremental adjustments to the selected digital input value in order to achieve the adjusted digital input value.

In each of the above-described system embodiments, the processor can make the series of relatively small incremental adjustments over a specified period of time (e.g., before the next test image for the same target color value is scheduled to be generated and evaluated). Additionally, to better ensure that any adjustments that are made to the LUT are gradually and imperceptibly implemented, the amount of change allowed (i.e., the predetermined maximum delta) with each adjustment can be limited. For example, if the target values for the color comprise target tone values and the digital input values are halftone dot area coverage amounts, then each adjustment in the series can be limited to a change of no more than a predetermined maximum halftone dot area coverage amount. Furthermore, in each of the above-described system embodiments, the processor can further make the series of relatively small incremental adjustments according to a predetermined schedule in order to avoid mid-image color corrections, mid-document color corrections, and/or mid-print job color corrections.

Also disclosed herein are embodiments of an associated method for gradually adjusting a look-up table (LUT) in order to improve the regulation of color quality of printed images. These method embodiments can comprise storing (e.g., in a data storage device) a look-up table (LUT) that is representative of a tone reproduction curve of a print engine and that correlates target values for a particular color (e.g., target tone values) with digital input values (e.g., halftone dot area coverage amounts) required to achieve the target values. Next, a test image is generated (e.g., by the print engine) based on a selected digital input value from the LUT in an attempt to achieve a corresponding target value for the color (i.e., a corresponding target tone value). The test image is then evaluated (e.g., by an optical sensor, such as a spectrophotometer and a densitometer) to determine the actual value of the color as printed in the test image (e.g., the actual tone value). Then, based on the results of this evaluation, the LUT can be updated.

For example, in one embodiment, the difference between the actual value of the color in the test image and the corresponding target value for the color, which was correlated in the LUT with the selected digital input value and which used to generate the test image, can be determined (e.g., by a processor). Then, the LUT can be updated (e.g., by the processor) so that the corresponding target value for the color is instead correlated in the LUT with an adjusted digital input value that corrects for this difference. Depending upon the size of the required adjustment, the LUT can be updated by making a series of relatively small incremental adjustments to the selected digital input value in order to achieve the adjusted digital input value.

In another embodiment, rather than updating the LUT based on the difference between the corresponding target value for the color and the actual value of the color in the test image, the LUT can be updated based on the difference between the corresponding target value for the color and a predicted value for the color at a future time. Specifically, in this method embodiment, historical information characterizing time-dependent changes in the tone reproduction curve can also be stored (e.g., on the data storage device). Then, based on this historical information as well as the actual value of the color in the current test image, a predicted value for the color for the next test image to be generated based on the same selected digital input value can be determined (e.g., by the processor). Then, the difference between this predicted value for the color and the corresponding target value for the color can be determined (e.g., by the processor) and the LUT can be updated (e.g., also by the processor) so that the corresponding target value for the color is instead correlated in the LUT with an adjusted input value that corrects for this difference. As with the previously described embodiment, depending upon the size of the required adjustment, the LUT can be updated by making a series of relatively small incremental adjustments to the selected digital input value in order to achieve the adjusted digital input value.

In each of the above-described method embodiments, the series of relatively small incremental adjustments can be made over a specified period of time (e.g., before the next test image is scheduled to be generated and evaluated). Additionally, to better ensure that any adjustments that are made to the LUT are gradually and imperceptibly implemented, the amount of change allowed (i.e., the predetermined maximum delta) with each adjustment can be limited. For example, if the target values are target tone values and the digital input values are halftone dot area coverage amounts, then each adjustment in the series can be limited to a change of no more than a predetermined maximum halftone dot area coverage amount. Furthermore, in each of the above-described system embodiments, the processor can further make the series of relatively small incremental adjustments according to a predetermined schedule in order to avoid mid-image color corrections, mid-document color corrections, and/or mid-print job color corrections.

Also disclosed herein are embodiments of a computer program product. This computer program product can comprise a computer usable medium having computer useable program code embodied therewith. The computer usable program code can be configured specifically to perform the above-described method.

These and other features are described in, or are apparent from, the following detailed description.

BRIEF DESCRIPTION OF THE DRAWINGS

Various exemplary embodiments of the systems and methods are described in detail below, with reference to the attached drawing figures, in which:

FIG. 3 is an illustration of an exemplary look-up table for a print engine;

FIG. 6 is a diagram illustrating an exemplary series of adjustments that can be made to a digital input value, which is correlated in a look-up table to a particular target value for a color, to compensate for actual drift;

FIG. 7 is a diagram illustrating another exemplary series of adjustments that can be made to a digital input value, which is correlated in a look-up table to a particular target value for a color, to compensate for predicted drift;

DETAILED DESCRIPTION

Figure 1:
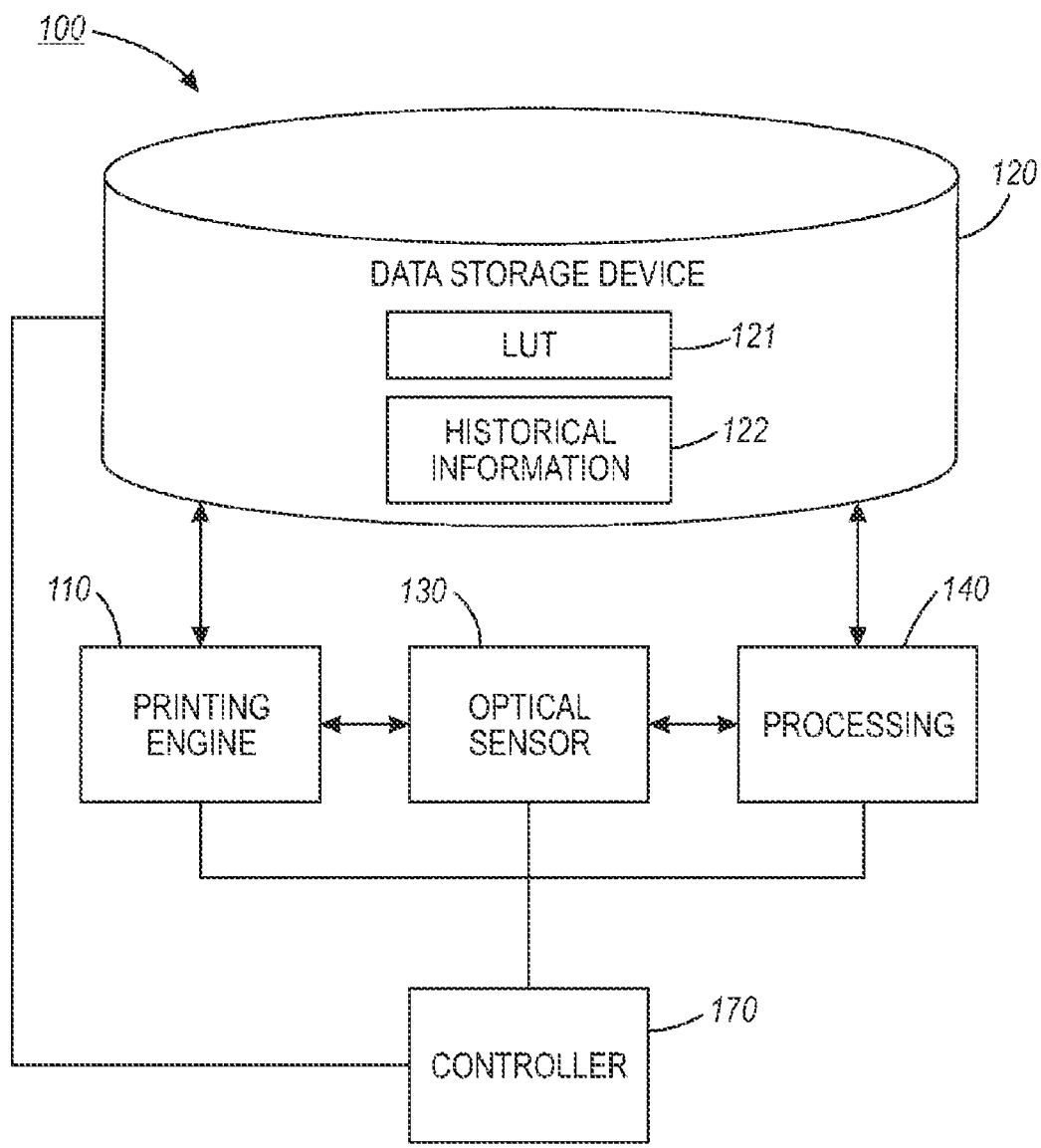
FIG. 1 is a schematic diagram illustrating an embodiment of a system for gradually adjusting a look-up table for a print engine in order to improve the regulation of color quality of printed images.

The embodiments disclosed herein and the various features and advantageous details thereof are explained more fully with reference to the non-limiting embodiments that are illustrated in the accompanying drawings and detailed in the following description.

As discussed above, in order to print an image having a desired color a printing system will use a look-up table (LUT) that is representative of a tone reproduction curve for its print engine. Such an LUT is unique to the print engine and correlates target values for a color (e.g., target tone values) with digital input values (e.g., halftone dot area coverage amounts expressed, for example, in terms of levels, ratios or percentages) that will achieve those target values. Unfortunately, with time and use, the tone reproduction curve drifts causing the LUT to become less accurate such that the digital input values no longer achieve the target values. Changes in the tone reproduction curve are typically monitored by periodically generating and evaluating test images (i.e., test patches) to identify differences between target values for a particular color and actually achieved values. Once identified, various different techniques can be used alone and/or in combination to compensate for these differences. For example, various physical actuators within the printing system may be selectively adjusted in order to alter specific printing parameters, such as developer bias, charge level, etc. and, thereby to compensate for changes to the tone reproduction curve. Additionally or alternatively, the LUT for the tone reproduction curve can be updated. However, when there is a significant difference between a target value for a color and the actually achieved value, as is often the case when there is an extended period of time between monitoring operations, the above-described compensation techniques can result in a sudden and visually perceivable (i.e., noticeable) color correction. Such visually perceivable or noticeable color corrections are generally objectionable to customers, particularly, if they occur mid-image or mid-document.

In view of the foregoing, disclosed herein are embodiments of a system and a method for gradually adjusting a look-up table (LUT) for a print engine (i.e., for slewing the adjustments to a LUT) in order to improve the regulation of color quality of printed images. Specifically, the embodiments can update (i.e., adjust) an LUT for a print engine so that a target value for a particular color (e.g., a target tone value) is correlated in the LUT with an adjusted digital input value (e.g., an adjusted halftone dot area coverage amount) that corrects for a detected or predicted (i.e., forecasted) change in a tone reproduction curve following the generation and evaluation of a test image (i.e., a test patch). However, depending upon the size of the required adjustment, a series of relatively small incremental adjustments (as opposed to a single relatively large adjustment) can be made to the LUT table over a specified period of time (e.g., before the next test image for the same target color value is scheduled to be generated and evaluated). Each incremental adjustment in the series can be limited to a predetermined maximum delta in order to ensure that any LUT adjustments, which are made to the LUT following the generation and evaluation of one test image and before the generation and evaluation of the next test image for the same target color value, are gradually and imperceptibly implemented. Additionally, these adjustments can be made according to a predetermined schedule in order to avoid mid-image color corrections, mid-document color corrections, and/or mid-print job color corrections.

More particularly, referring to FIG. 1, disclosed herein are embodiments of a system 100 for gradually adjusting a look-up table (LUT) for a print engine (i.e., for slewing the adjustments to a LUT) in order to improve the regulation of color quality of printed images. These system embodiments can comprise a print engine 110, a data storage device 120, an optical sensor 130, a processor 140 and a controller 170 operatively connected to each of the other components 110, 120, 130 and 140.

The print engine 110 can comprise a conventional electrostatographic print engine, for example, as described in detail in U.S. Pat. No. 7,291,399 of Kaplan et al., issued on Nov. 6, 2007, assigned to Xerox Corporation of Norwalk, Conn., USA, and incorporated herein by reference. That is, the print engine 110 can comprise a photoreceptor 10 that can be charged on its surface by means of a charger 12 to which a voltage has been supplied from power supply 11. The photoreceptor 10 can be exposed to light from an optical system or an image input apparatus 13, such as a laser and/or light emitting diode, to form an electrostatic latent image thereon. Generally, the electrostatic latent image can be developed by bringing a developer mixture of toner particles from developer station 14 into contact with the latent image (e.g., by use of a magnetic brush, powder cloud, or other known development process). After the latent image is developed (i.e., after the toner particles have been deposited onto the photoreceptor forming the toner image), the toner image can be transferred from the photoreceptor 10 to a print media sheet 16 by a transfer means 15 that employs, for example, pressure transfer techniques, electrostatic transfer techniques, or the like. Alternatively, the toner image can be transferred from the photoreceptor 10 to an intermediate transfer member (e.g., an image transfer belt) and then subsequently transferred from the intermediate transfer member to the print media sheet 16. After the toner image is transferred to the print media sheet 16, the photoreceptor 10 can rotate through a cleaning station 17, where toner particles left on the photoreceptor 10 are removed by cleaning member 22 (e.g., a blade, brush, or other cleaning apparatus). Additionally, the print media sheet 16 can be advanced along a sheet transport path through a fuser 19 (i.e., a fusing station) comprising, for example, fusing and pressure rolls that apply heat and pressure in order to fuse (i.e., fix) the toner particles forming the toner image onto the print medium.

Figure 4:
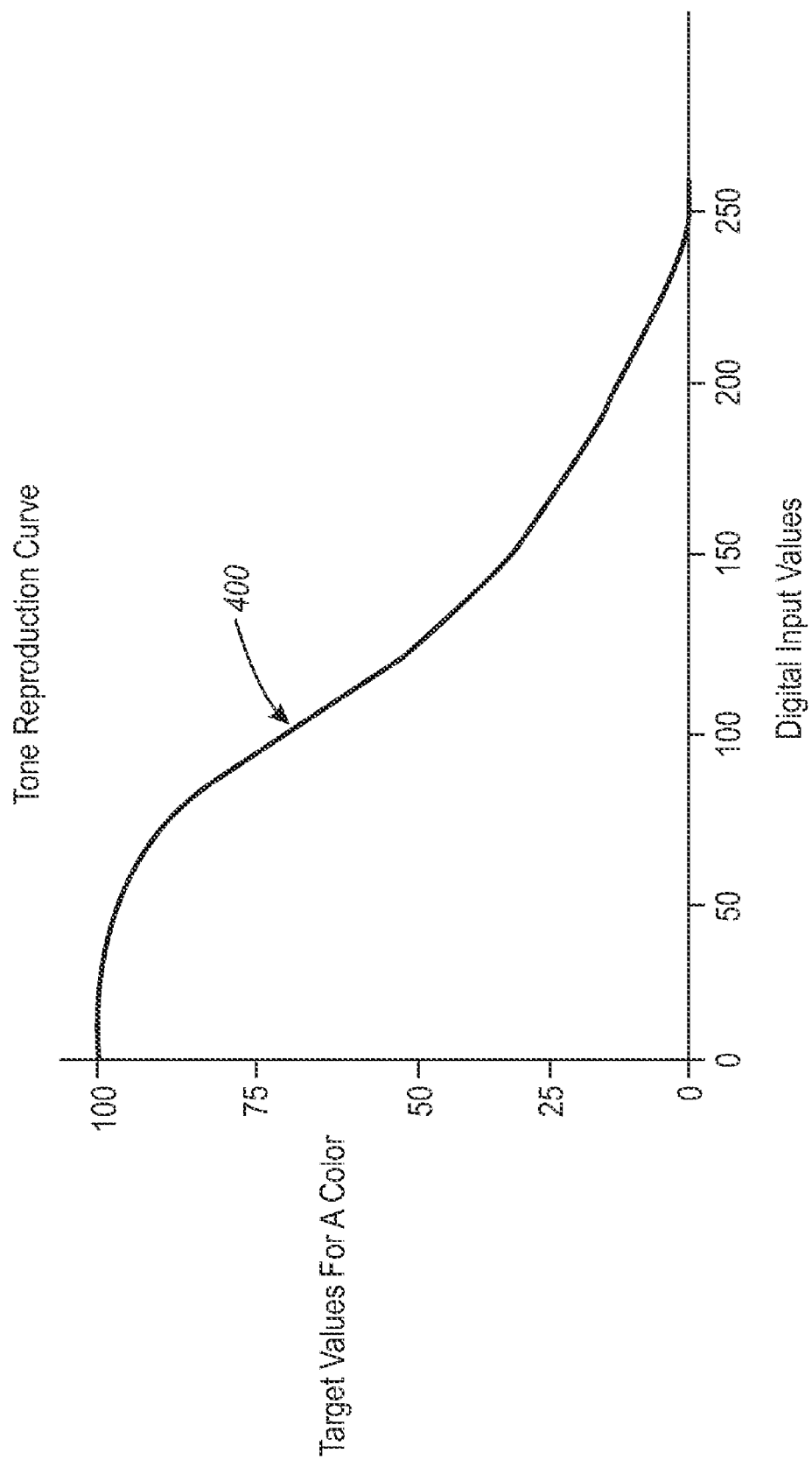
FIG. 4 is a graph illustrating an exemplary tone reproduction curve for a print engine.

The data storage device 120 can comprise, for example, a computerreadable data storage medium adapted to (i.e., configured to) store data, including but not limited to, a magnetic or optical disk drive, a programmable gate array, a compact flash memory, or other flash memory, a system or cache memory, etc. The data storage device 120 can store a look-up table (LUT) 121 (e.g., as shown in FIG. 3) that is representative of a tone reproduction curve 400 (e.g., as shown in FIG. 4) for the print engine 110. Specifically, the exemplary look-up table of FIG. 3, Target Values For A Color: Target Tone Values in L*Units (Darkest=0 to Lightest=100) are associated with Digital Area Coverage Values: Halftone Dot Area Coverage Amount (Levels 0-255). For illustration purposes in FIG. 3, a tone value of pure white equals 100 and a tone value of pure black equals 0; however, those skilled in the art will recognize that such tone values are considered physically unachievable. The tone reproduction curve 400 can correlate Target Values For A Color (E.g., Target Tone Values In L* Units, where Darkest=0 And Lightest=100) with Digital Input Values (E.g., Halftone Dot Area Coverage Levels 0-255) required by the print engine 110 to achieve the target values, as shown in FIG. 4. For example, the target values for a particular color can comprise target tone values measured, for example, in CIELAB L* units ranging from 0 to 100 with 0 being the darkest and 100 being the lightest and the digital input values can comprise halftone dot area coverage amounts, also referred to as halftone levels (e.g., ranging from 0-255). For illustration purposes in FIG. 4, a tone value of pure white equals 100 and a tone value of pure black equals 0; however, those skilled in the art will recognize that such tone values are considered physically unachievable. This curve 400 can be converted into a table format, as shown in FIG. 3, and stored as reference for subsequent printing processes. However, as mentioned above, with time and use, such a tone reproduction curve 400 and, thereby the LUT 121, can become less accurate (i.e., can drift) such that the digital input values do not achieve the target values as indicated in the LUT 121. Thus, test images (i.e., test patches) are periodically generated and evaluated to in order to update the LUT 121, as necessary.

Figure 2:
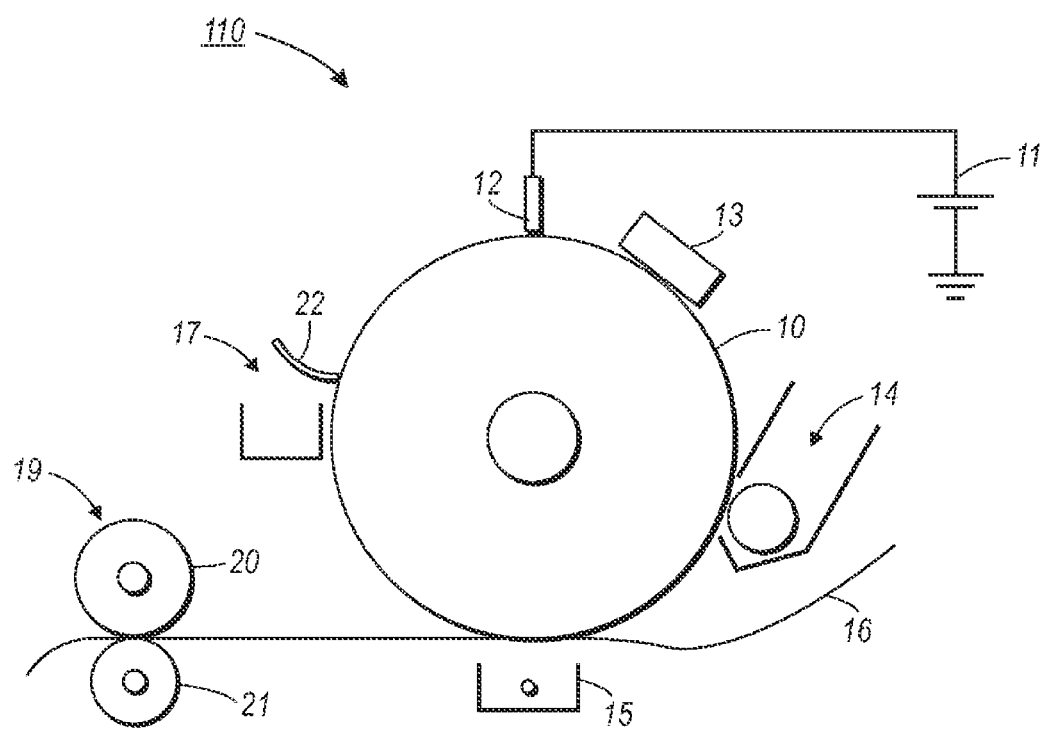
FIG. 2 is a schematic diagram illustrating an exemplary print engine that can be incorporated into the system of FIG. 1.

To that end, in addition to performing conventional printing processes, as discussed above, the print engine 110 can also generate (i.e., can also be adapted to generate, configured to generate, etc.) test images (i.e., test patches) for target color values. For example, referring again to FIG. 2, a test image can be generated by the print engine 110 based on a selected digital input value (e.g., a selected halftone dot area coverage amounts) from the LUT 121 in an attempt to achieve a corresponding target value for a particular color (e.g., a corresponding target tone value). Specifically, a latent image can be created at a predetermined test location on the photoreceptor 10. The latent image can subsequently be passed by the developer station 14 for development (i.e., for formation of a toner image). Depending upon the embodiment and also depending upon the configuration of the system 100 and, particularly, depending upon the placement of the optical sensor 130 within the system 100, the test image can comprise the toner image as positioned on the photoreceptor 10. Alternatively, the test image can comprise the toner image as positioned on an intermediate transfer member (e.g., after it has been transferred from the photoreceptor 10). Alternatively, the test image can comprise the toner image as it positioned on a print media sheet 16 (e.g., after it has been transferred directly from the photoreceptor 10 or indirectly via an intermediate transfer member).

Once a test image is generated, the optical sensor 130 can evaluate (i.e., can be adapted to evaluate, can be configured to evaluate, etc.) the test image to determine the actual value of the color in the test image (e.g., the actual tone value measured, for example, in CIELAB L* units ranging from 0 to 100). The optical sensor 120 can comprise any sensor device that is suitable for directly measuring or inferring the color value (e.g., a spectrophotometer or a densitometer). Such optical sensors are well-known in the art (e.g., see U.S. Pat. No. 7,239,819 of Gross et al. incorporated by reference above) and, thus, the details are omitted from this specification in order to allow the reader to focus on the salient aspects of the embodiments disclosed. The results from the optical sensor 130 can then be used (e.g., by the processor 140) to update the LUT 121.

Specifically, in one embodiment, the processor 140 can receive (i.e., can be adapted to receive, configured to receive, etc.) from the optical sensor 130, the actual value of the color in the test image. The processor 140 can also access (i.e., can be adapted to access, configured to access, etc.) the data storage device 120 in order to determined the corresponding target value for the color, which is listed in the LUT 121 as being correlated with the selected digital input value that was used to generate the test image. Then, the processor 140 can determine (i.e., can be adapted to determine, configured to determine, etc.) the difference between the actual value of the color in the test image, as determined by the optical sensor 130, and the corresponding target value for the color, as set out in the LUT 121. The processor 140 can then update (i.e., can be adapted to update, configured to update, etc.) the LUT 121 so that the corresponding target value is instead correlated in the LUT 121 with an adjusted digital input value that corrects for this difference (i.e., that corrects for the difference between the corresponding target value for the color and the actual value of the color in the test image).

Figure 5:
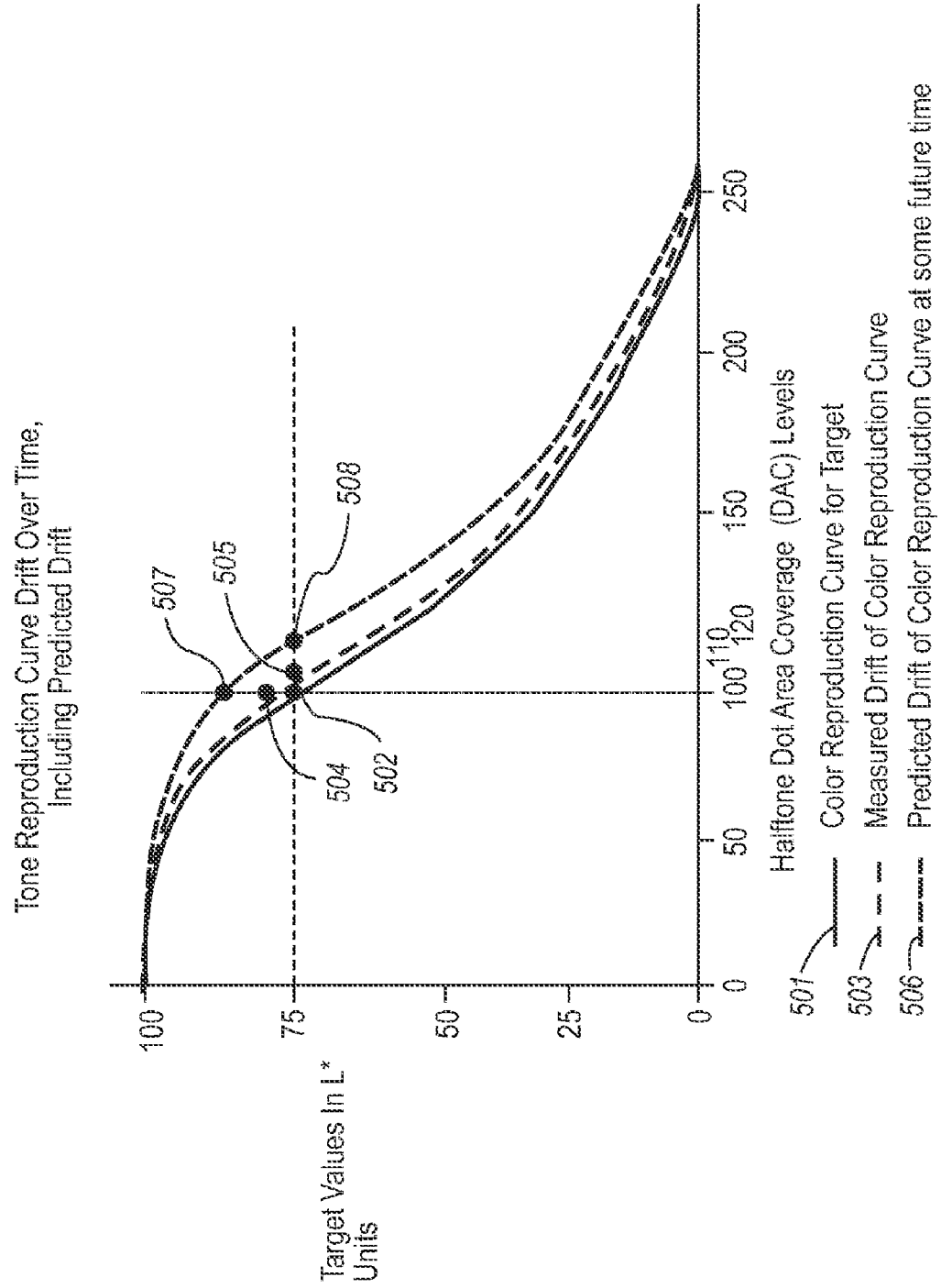
FIG. 5 is a graph illustrating drift of the tone reproduction curve of FIG. 4 over time, including predicted drift.

For example, as shown in FIG. 5, the color reproduction curve 501 can identify a target value 502 for particular color that should be achieved with a selected digital input value (e.g., a target 75% reflectance should be achieved with a halftone level of 100). However, if, as indicated on the measured drift of color reproduction curve 503, a selected digital input value results in a test image with an actual color value 504 that is different from the target color value (e.g., with an actual tone value of 85 L* as opposed to the target tone value of 75 L*), then the digital input value in the LUT 121 will need to be adjusted (see adjusted dot area coverage (DAC) 505) to correct for this difference. That is, it will need to be adjusted to correct for the difference between the corresponding target value for the color and the actual value of the color in the test image (e.g., the halftone level can be adjusted from level 100 to level 110 in order in order to achieve the target tone value of 75 L*). For illustration purposes in FIG. 5, a tone value of pure white equals 100 and a tone value of pure black equals 0; however, those skilled in the art will recognize that such tone values are considered physically unachievable.

However, depending upon the size of the required adjustment, the processor 140 can update the LUT 121 by making a series of relatively small incremental adjustments to the selected digital input value (as opposed to a single relatively large adjustment) in order to achieve the adjusted digital input value. That is, if the size of the required adjustment to the selected digital input value is greater than a preset limit (e.g., greater than a predetermined number of halftone levels), then the LUT 121 can be updated by making a series of relatively small incremental adjustments (as opposed to a single relatively large adjustment). The preset limit can be a size above which any adjustments to the LUT 21 would be visibly perceivable in a printed image. For example, as illustrated in FIG. 6, a required 10-level adjustment from level 100 to level 100 in order to achieve the target tone value of 75 L*can be made by making 10 single level adjustments over time.

In another embodiment, rather than updating the LUT 121 based on the difference between the corresponding target value of the color and the actual value of the color in the test image, the processor 140 can update the LUT 121 based on the difference between the corresponding target value for the color and a predicted value for the color at a future time (e.g., when the next test image is scheduled to be generated and evaluated). Specifically, like the previously described embodiment, the processor 140 can receive (i.e., can be adapted to receive, configured to receive, etc.) from the optical sensor 130, the actual value for the color in the test image. In this system embodiment, however, the data storage device 120 can also store historical information 122 characterizing time-dependent changes in the tone reproduction curve. The processor 140 can access (i.e., can be adapted to access, configured to access, etc.) the data storage device 120 and, particularly, the historical information 122 in the data storage device 120. Then, based on this historical information 122 as well as the actual value of the color in the current test image, the processor 140 can determine (i.e., can be adapted to determine, configured to determine, etc.) the predicted value for the color in the next test image. That is, the processor 140 can forecast or make a prediction as to what the value of the color will be for the next schedule test image, which is to be printed by the print engine at a future time and based on the same selected digital input value used to generate the current test image. In this case, the processor 140 can then further determine the difference between this predicted value and the corresponding target value for the color. The processor 140 can then update (i.e., can be adapted to update, configured to update, etc.) the LUT 121 so that the corresponding target color value is instead correlated in the LUT 121 with an adjusted input value that corrects for this difference (i.e., that corrects for the difference between the corresponding target value for the color and the predicted value for the color in the next test image scheduled to be generated based on the same selected digital input value).

For example, as shown in FIG. 5, the tone reproduction curve can identify a target value 502 for a color that should be achieved with a selected digital input value (e.g., a target tone value of 75 L*) that should be achieved with a halftone level of 100). However, as indicated on the measured drift of color reproduction curve 503, an evaluation by an optical sensor 130 indicates that this selected digital input value results in a test image where the actual value 504 of the color is different from the target value (e.g., a halftone level of 100 results in an actual tone value of 85 L* as opposed to the target tone value of 75 L*). Furthermore, a prediction by the processor 140 based on historical information and also on the actual value 504 of the color in the test image indicates, as shown on the predicted drift of color reproduction curve at some future time 506, that this selected digital input value will result in the next scheduled test image having a color value 507 that is different from the target value by an even greater amount (e.g., a halftone level of 100 will likely result in the next test image having a tone value of 95 L* as opposed to the target 75 L*). Thus, the digital input value in the LUT 121 will need to be adjusted (see adjusted dot area coverage (DAC) 508) to correct for this difference. That is, the digital input value in the LUT 121 needs to be adjusted to correct for the difference between the corresponding target value for the color and the predicted value for the color (e.g., the halftone level can be adjusted from level 100 to level 120 in order to achieve the target tone value of 75 L* since the larger the halftone value the less the reflectance and the darker the color). For illustration purposes in FIG. 5, a tone value of pure white equals 100 and a tone value of pure black equals 0; however, those skilled in the art will recognize that such tone values are considered physically unachievable.

Again, depending upon the size of the required adjustment, the processor 140 can update the LUT 121 by making a series of relatively small incremental adjustments to the selected digital input value (as opposed to a single relatively large adjustment) in order to achieve the adjusted digital input value. That is, if the size of the required adjustment to the selected digital input value is greater than a preset limit (e.g., greater than a predetermined number of halftone levels), then the LUT 121 can be updated by making a series of relatively small incremental adjustments (as opposed to a single relatively large adjustment). The preset limit can be a size above which any adjustments to the LUT 21 would be visibly perceivable in a printed image. For example, as illustrated in FIG. 7, a required 20-level adjustment from level 100 to level 120 in order to achieve the target tone value of 75 L* can be made by making 10 two-level adjustments over time.

In each of the above-described system embodiments, the processor 140 can make (i.e., can be adapted to make, configured to make, etc.) the series of relatively small incremental adjustments over a specified period of time and particularly over a period of time before the next test image for the same target color is scheduled to be generated and evaluated. Additionally, to better ensure that any adjustments made to the LUT 121 are gradually and imperceptibly implemented, the amount of change allowed with each adjustment can be limited. That is, with each adjustment, the allowable change to the selected digital input value can be set so that it is no more than a predetermined maximum delta. For example, if the target color values are target tone values and if the digital input values are halftone dot area coverage amounts, then each adjustment in the series can be limited to a change of no more than a predetermined maximum halftone dot area coverage amount. This predetermined maximum halftone dot area coverage amount can be expressed in terms of coverage percentage (e.g., a given percentage increase or decrease in halftone dot area coverage) or coverage level (e.g., a given increase or decrease in the number of levels of halftone dot area coverage). Additionally, in each of the above-described system embodiments, the processor 140 can further make (i.e., can be adapted to make, configured to make, etc.) the series of relatively small incremental adjustments according to a predetermined schedule in order to avoid mid-image color corrections, mid-document color corrections, and/or mid-print job color corrections. That is, the schedule can specify that color adjustments may only be made to the LUT 121 between printing different documents or between printing different print jobs.

It should be noted that if this predetermined schedule also limits the number of incremental adjustments that can be made following generation and evaluation of one test image and before generation and evaluation of the next test image for the same target color value (i.e., if the schedule sets a predetermined maximum number of incremental adjustments that can be made in response to the generation and evaluation of a test image), then the predetermined maximum delta for each adjustment (e.g., the predetermined maximum amount by which a halftone dot area coverage amount can be increased or decreased with each adjustment) may vary as a function of the predetermined number of incremental adjustments. For example, as illustrated in FIG. 6, the maximum number of adjustments may be limited to 10. Thus, if the required adjustment is from halftone level 100 to halftone level 110, then the predetermined maximum delta with each adjustment in the series will be limited to one level. However, as illustrated in FIG. 7, if the maximum number of adjustments is limited to 10 and if the required adjustment is from halftone level 100 to halftone level 120, then the predetermined maximum delta with each adjustment in the series will be limited to two levels.

As mentioned above, the system embodiments 100 can also comprise a controller 170, which is operatively connected to the print engine 110, data storage device 120 optical sensor 130 and processor 140. This controller 170 can control operation of the system components and specifically can control performance of the various processes described above, including but not limited to the printing of test images by the print engine 110, evaluating of those test images by the optical sensor 130 and updating the LUT 121 by the processor 140. This controller 170 can comprise, for example, a programmable, self-contained, dedicated mini-computer having a central processor unit (CPU), electronic storage, and a display or user interface (UI) and can function as the main control system for the printing system within which the print engine 110 is incorporated.

Figure 8:
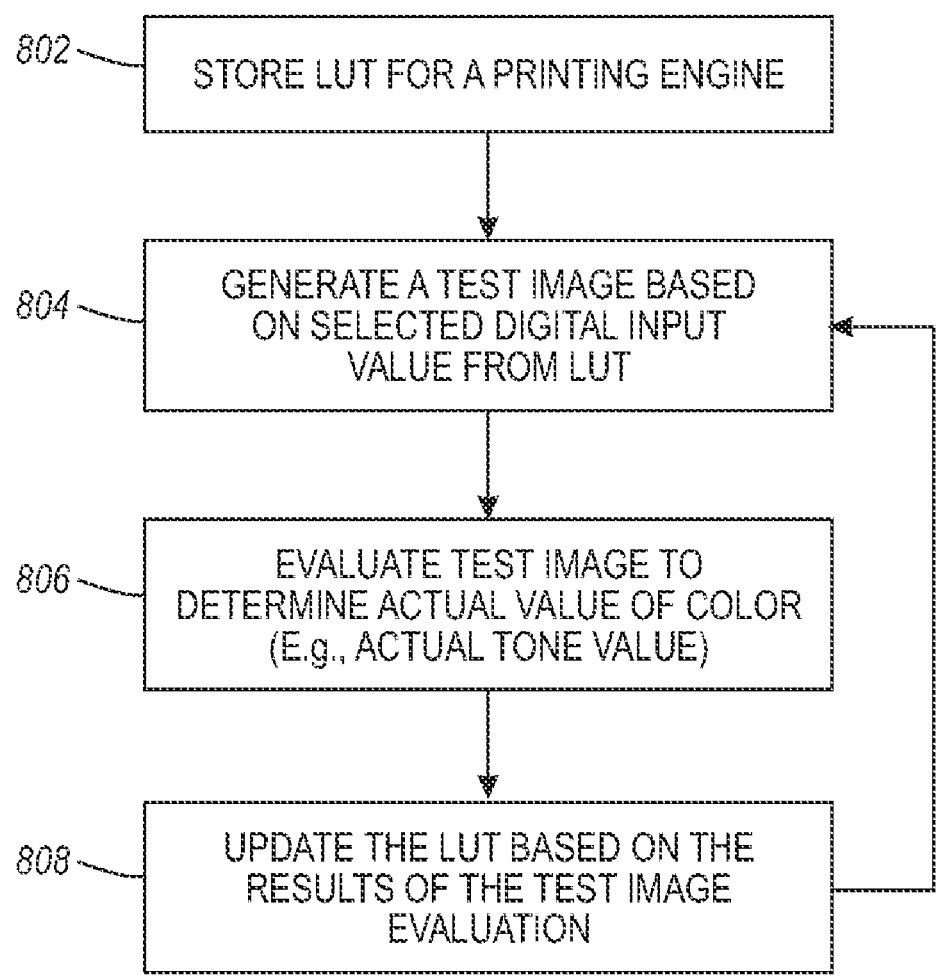
FIG. 8 is a flow diagram illustrating an embodiment of a method for gradually adjusting a look-up table for a print engine in order to improve the regulation of color quality of printed images.

Referring to FIG. 8 in combination with FIG. 1, also disclosed herein are embodiments of an associated method for gradually adjusting a look-up table (LUT) for a print engine (i.e., for slewing the adjustments to an LUT) in order to improve the regulation of color quality of printed images. These method embodiments can comprise storing (e.g., in a data storage device 120) a look-up table (LUT) 121 for a print engine 110 (802). Specifically, in the look-up table of FIG. 3, Target Values For A Color: Target Tone Values in L*Units (Darkest=0 to Lightest=100) are associated with Digital Area Coverage Values: Halftone Dot Area Coverage Amount (Levels 0-255). For illustration purposes in FIG. 3, a tone value of pure white equals 100 and a tone value of pure black equals 0; however, those skilled in the art will recognize that such tone values are considered physically unachievable. A tone reproduction curve 400 can correlate Target Values For A Color (E.g., Target Tone Values In L* Units, where Darkest=0 And Lightest=100) with Digital Input Values (E.g., Halftone Dot Area Coverage Levels 0-255) required by the print engine 110 to achieve the target values, as shown in FIG. 4. For example, the target values for a particular color can comprise target tone values measured, for example, in CIELAB L* units ranging from 0 to 100 with 0 being the darkest and 100 being the lightest and the digital input values can comprise halftone dot area coverage amounts, also referred to as halftone levels (e.g., ranging from 0-255). For illustration purposes in FIG. 4, a tone value of pure white equals 100 and a tone value of pure black equals 0; however, those skilled in the art will recognize that such tone values are considered physically unachievable. This curve 400 can be converted into a table format, e.g., as shown in FIG. 3, and can be stored in a data storage device 120 at process 802, as reference for subsequent printing processes. However, as mentioned above, with time and use, such a tone reproduction curve 400 and, thereby the LUT 121, can become less accurate (i.e., can drift) such that the digital input values do not achieve the target values as indicated in the LUT 121. Thus, test images (e.g., test patches) are typically periodically generated and evaluated to in order to update the LUT 121, as necessary. For illustration purposes in FIG. 5, a tone value of pure white equals 100 and a tone value of pure black equals 0; however, those skilled in the art will recognize that such tone values are considered physically unachievable.

Specifically, a test image is generated (e.g., by the particular print engine 110) based on a selected digital input value from the LUT 121 in an attempt to achieve a corresponding target value for a color (i.e., a corresponding target tone value) (804). For example, as described in detail above with regard to the system embodiments and referring to the print engine illustrated in FIG. 2, a latent image can be created at a predetermined test location on the photoreceptor 10. The latent image can subsequently be passed by the developer station 14 for development (i.e., formation of a toner image). Depending upon the embodiment and the configuration of the system 100 and, particularly, depending upon placement of the optical sensor 130 within the system 100, the test image can comprise the toner image as positioned on the photoreceptor 10. Alternatively, the test image can comprise the toner image as positioned on an intermediate transfer member (e.g., after it has been transferred from the photoreceptor 10). Alternatively, the test image can comprise the toner image as it is positioned on a print media sheet 16 (e.g., after it has been transferred directly from photoreceptor 10 or indirectly via an intermediate transfer member).

Once the test image is generated at process 804, it can be evaluated (e.g., by an optical sensor, such as a spectrophotometer and a densitometer) to determine the actual value of the color in the test image (e.g., the actual tone value measured in CIELAB L* units ranging from 0 to 100) (806). Techniques for evaluating test images (i.e., techniques for measuring or inferring a color value) are well-known in the art (e.g., see U.S. Pat. No. 7,239,819 of Gross et al. incorporated by reference above) and, thus, the details are omitted from this specification in order to allow the reader to focus on the salient aspects of the embodiments disclosed. Once the test image is evaluated at process 806, the results of the evaluation can, if necessary, be used to update the LUT 121, as discussed in detail below (808).

Specifically, referring to FIG. 9 in combination with FIG. 1, in one embodiment of the method, the process 808 of updating the LUT 121 can be accomplished as follows. The actual value of the color in the test image can be received (e.g., by the processor 140 from the optical sensor 130) (902). Additionally, the data storage device 120 can be accessed (e.g., by the processor 140) in order to determined the corresponding target value for the color, which is listed in the LUT 121 as being correlated with the selected digital input value used to generate the test image (904). Then, the difference between the actual value of the color in the test image, as determined by the optical sensor 130, and the corresponding target value for the color, as set out in the LUT 121, can be determined (e.g., also by the processor 140) (908). Next, the LUT 121 can be updated (e.g., by the processor 140) so that the corresponding target value for the color is instead correlated in the LUT 121 with an adjusted digital input value that corrects for this difference (i.e., that corrects for the difference between the corresponding target value for the color and the actual value of the color in the test image) (908).

For example, as shown in FIG. 5, the color reproduction curve 501 can identify a target value 502 for a color that should be achieved with a selected digital input value (e.g., a target tone value of 75 L* should be achieved with a halftone level of 100). However, if, as indicated on the measured drift of color reproduction curve 503, this selected digital input value results in a test image with an actual color value 503 that is different from the target value (e.g., with an actual tone value of 85 L* as opposed to the target tone value of 75 L*), then the digital input value in the LUT 121 will need to be adjusted (see adjusted dot area coverage (DAC) 505) to correct for this difference. That is, it will need to be adjusted to correct for the difference between the corresponding target value for the color and the actual value of the color in the test image (e.g., the halftone level can be adjusted from level 100 to level 110 in order to achieve the target tone value of 75 L*). For illustration purposes in FIG. 5, a tone value of pure white equals 100 and a tone value of pure black equals 0; however, those skilled in the art will recognize that such tone values are considered physically unachievable.

However, depending upon the size of the required adjustment, the LUT 121 can be updated by making a series of relatively small incremental adjustments to the selected digital input value (as opposed to a single relatively large adjustment) in order to achieve the adjusted digital input value (910). That is, if the size of the required adjustment to the selected digital input value is greater than a preset limit (e.g., greater than a predetermined number of halftone levels), then the LUT 121 can be updated by making a series of relatively small incremental adjustments (as opposed to a single relatively large adjustment). The preset limit can be a size above which any adjustments to the LUT 21 would be visibly perceivable in a printed image. For example, as illustrated in FIG.

6, a required 10-level adjustment from level 100 to level 110 in order to achieve a target tone value of 75 L* can be made by making 10 single level adjustments over time.

The following exemplary technique can be used to make the series of relatively small adjustments to the LUT (i.e., can be used to slew the adjustment to the LUT) at process 910:

At time k the digital LUT, assuming 256 elements i.e., levels 0-255), may be expressed as, $$LUT(k)=[lut_1(k) lut_2(k) lut_3(k) \ldots lut_{256}(k)].$$

At time k+T the required digital LUT, assuming 256 elements, may be expressed as, $$LUT(k+T)=[lut_1(k+T) lut_2(k+T) lut_3(k+T) \ldots lut_{256}(k+T)].$$

The slewing from the LUT table at time k to k+T can take many functional forms. For purposes of illustration, a linear slew is used. Those skilled in the art will recognize that it may be desirable to discretize the slewing function and update only in the inter document zone regions so as not to adjust the LUT in the middle of the print. Whether this is required or not will depend on the magnitude and rounding of the adjustments.

Alternatively, the following exemplary technique can be used for making the series of relatively small adjustments (i.e., can be used to slew the adjustment to the LUT):

At any time between k and k+T, the applied digital LUT, ($LUT_{applied}$), may be expressed as, $$LUT_{applied}(k + \beta * T) = LUT(k) + (LUT(k+T) - LUT(k)) * (1 - e^{\frac{-\beta}{m}}),$$

where m is chosen suitably.

While this form can yield a discontinuity, it may be sufficient. Polynomial or spline forms may also be suitable.

Figure 10:
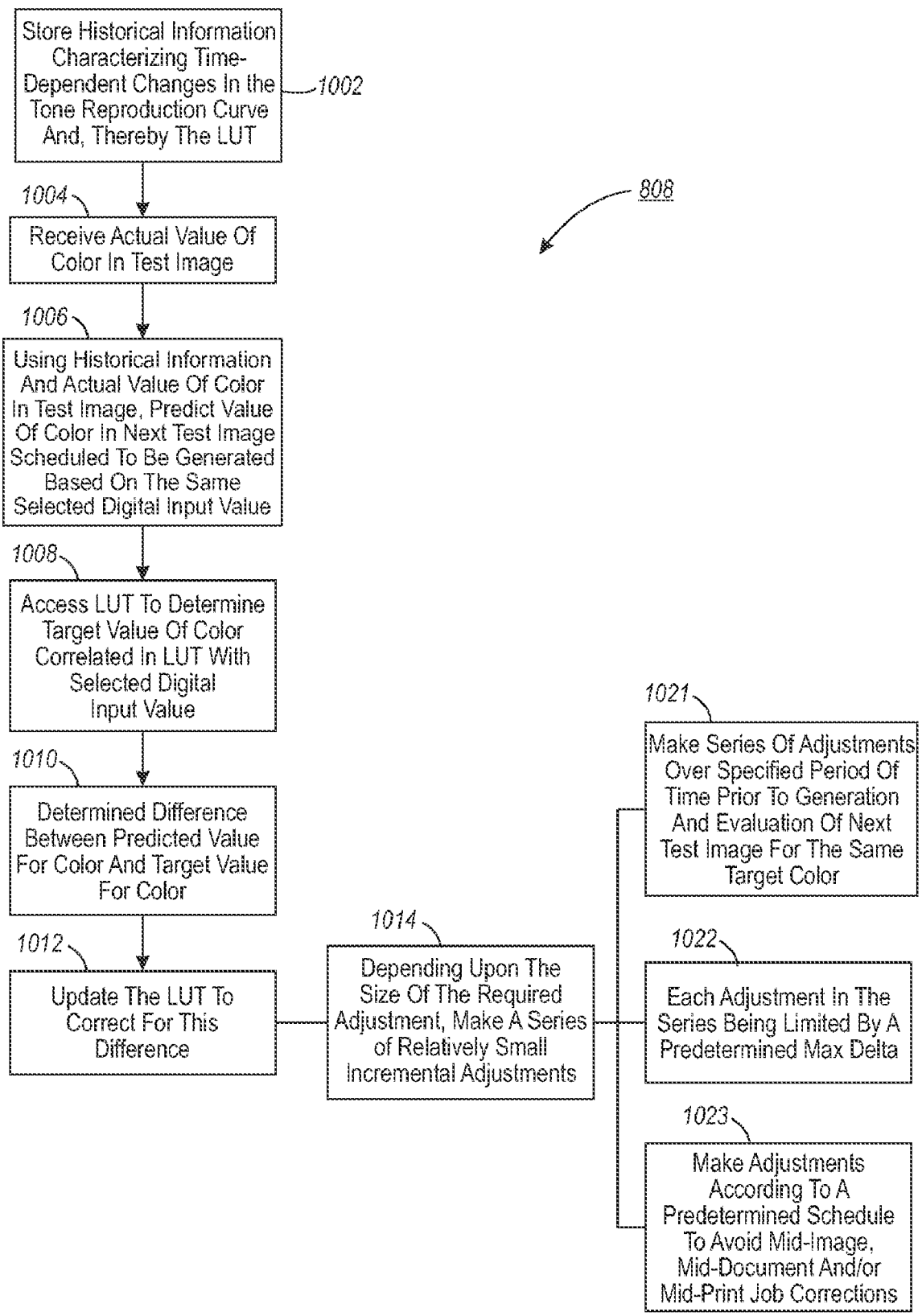
FIG. 10 is a flow diagram illustrating an alternative technique for performing process 808 of FIG. 8.

Referring to FIG. 10 in combination with FIG. 1, in another embodiment of the method, rather than updating the LUT at process 808 based on the difference between the corresponding target value for the color and the actual value of the color in the test image, the LUT is updated at process 808 based on the difference between the target value for the color and a predicted value for the color at a future time (e.g., at a time when the next test image is scheduled to be generated and evaluated for purposes of updating the LUT 121). Specifically, in this method embodiment, historical information 122 characterizing time-dependent changes in the tone reproduction curve can also be stored (e.g., in the data storage device 120) (1002). Additionally, the actual value of the color in the current test image can be received (e.g., by the processor 140 from the optical sensor 130) (1004).

Based on the historical information 122 as well as the actual value of the color in the current test image, a predicted value for the color in the next test image can be determined (e.g., by the processor 140) (1006). That is, a forecast or prediction can be made as to what the value of the color will be in the next test image, if that next test image were to be printed at a future time based on the same selected digital input value used to generate the current test image.

The following exemplary technique can be used for making such a forecast or prediction at process 1006. Specifically, a model based forecast can be applied based on an autoregressive integrated moving average (ARIMA) methodology. This ARIMA methodology is well known in the art and is based on a weighted sum of prior measurements. The forecast is typically optimal in some least squares sense. For example, the required LUT element at time $\hat{LUT}_{applied}(k+T)$ can be expressed as follows:

$$\hat{LUT}_{applied}(k+T)=LUT(k)+\emptyset_1 LUT(k-T)+\emptyset_2 LUT(k-2*T) \ldots +\emptyset_N LUT(k-N)*T.$$

Such an expression is optimal in a least squares sense if, for example, the underlying LUT follows a random walk, or follows any functional form, such as, where $LUT_{applied}(k+T) = \lambda_1 * LUT(k) + \lambda_2 * LUT(k-T) + \ldots \lambda_N * LUT(k-N*T) + \rho_1 * \epsilon(k) + \rho_2 * \epsilon(k-T) + \ldots \rho_N * (k-N*T)$, where $\epsilon(k)$ is a random uncorrelated noise term.

Additionally, in this embodiment of the method, the data storage device 120 can be accessed (e.g., by the processor 140) in order to determined the corresponding target value for the color, which is listed in the LUT 121 as being correlated with the selected digital input value used to generate the test image (1008). Then, the difference between the predicted value for the color and the corresponding target value for the color can be determined (e.g., by the processor 140) (1010). Next, the LUT 121 can be updated (e.g., also by the processor 140) so that the corresponding target value for the color is instead correlated in the LUT 121 with an adjusted digital input value that corrects for this difference (i.e., that corrects for the difference between the corresponding target value for the color and the predicted value for the color of the next test image) (1012).

Figure 9:
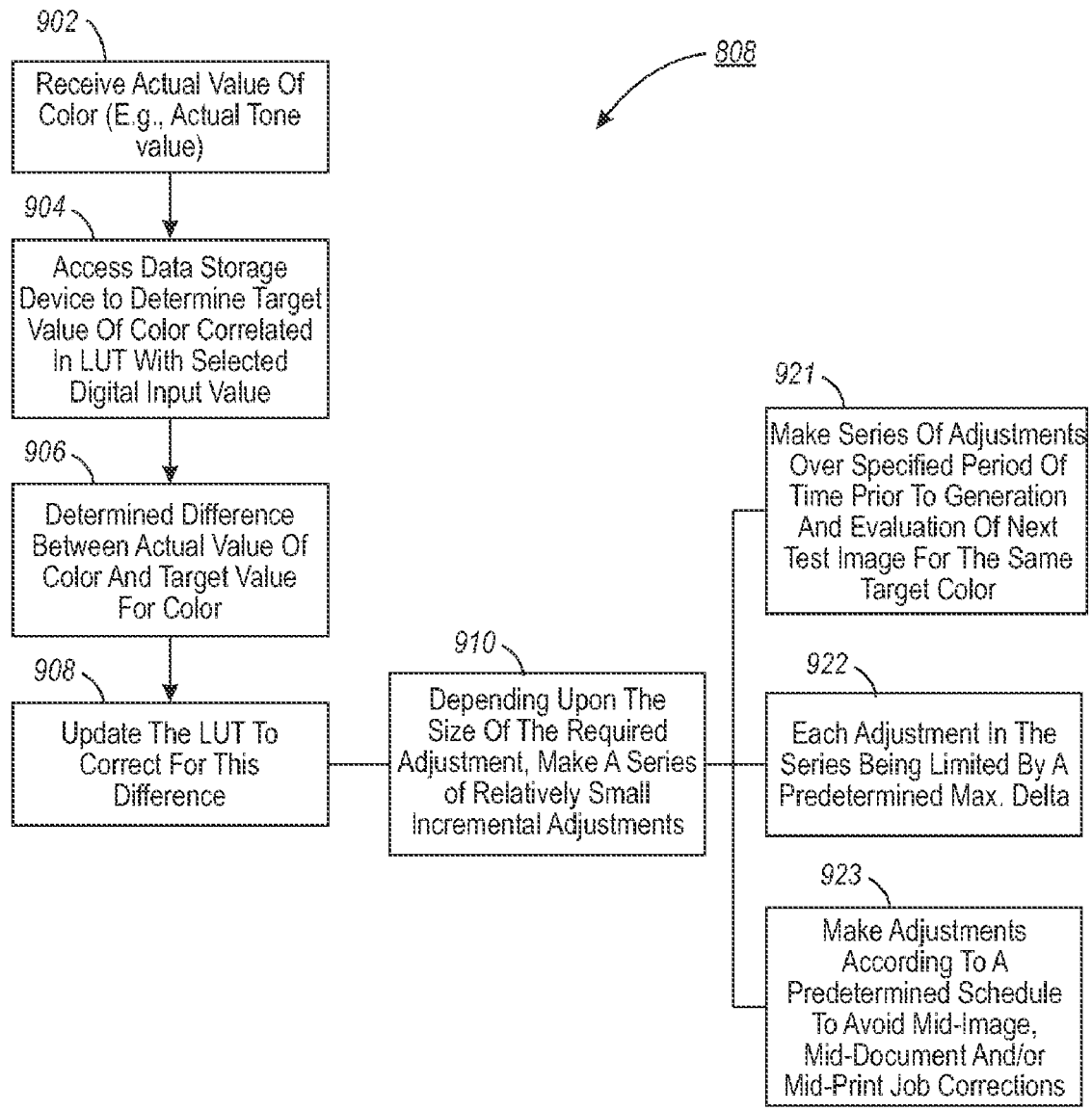
FIG. 9 is a flow diagram illustrating one technique for performing process 808 of FIG. 8.

Again, depending upon the size of the required adjustment, the LUT 121 can be updated by making a series of relatively small incremental adjustments to the selected digital input value (as opposed to a single relatively large adjustment) in order to achieve the adjusted digital input value (1014, see detailed discussion above regarding process 910 of FIG. 9). That is, if the size of the required adjustment to the selected digital input value is greater than a preset limit (e.g., greater than a predetermined number of halftone levels), then the LUT 121 can be updated by making a series of relatively small incremental adjustments (as opposed to a single relatively large adjustment). The preset limit can be a size above which any adjustments to the LUT 121 would be visibly perceivable in a printed image. For example, as illustrated in FIG. 7, a required 20-level adjustment from level 100 to level 120 in order to achieve the target tone value of 75 L* can be made by making 10 two-level adjustments over time.

Referring to FIGS. 9 and 10, in each of the above-described method embodiments, the series of relatively small incremental adjustments to the LUT can be over a specified period of time and particularly over a period of time before the next test image for the same target value is scheduled to be generated and evaluated (921, 1021). Additionally, to better ensure that any adjustments made to the LUT 121 are gradually and imperceptibly implemented (i.e., unnoticeable), the amount of change allowed with each adjustment can be limited (922, 1022). That is, with each adjustment, the allowable change to the selected digital input value can be set so that it is no more than a predetermined maximum delta. For example, if the target values for a color are target tone values and if the digital input values are halftone dot area coverage amounts, then each adjustment in the series can be limited to a change of no more than a predetermined maximum halftone dot area coverage amount. This predetermined maximum halftone dot area coverage amount can be expressed in terms of coverage percentage (e.g., a given percentage increase or decrease in halftone dot area coverage) or coverage level (e.g., a given increase or decrease in the number of levels of halftone dot area coverage). Additionally, in each of the above-described method embodiments, the series of relatively small incremental adjustments can be made according to a predetermined schedule in order to avoid mid-image color corrections, mid-document color corrections, and/or mid-print job color corrections (923, 1023). That is, the schedule can specify that color adjustments may only be made to the LUT between printing different documents or between printing different print jobs.

It should be noted that if this predetermined schedule also limits the number of incremental adjustments that can be made following generation and evaluation of one test image and before generation and evaluation of the next test image for the same target value (i.e., if the schedule sets a predetermined maximum number of incremental adjustments that can be made in response to the generation and evaluation of a test image), then the predetermined maximum delta set at process 922, 1022 for each adjustment (e.g., the predetermined maximum amount by which a halftone dot area coverage amount can be increased or decreased with each adjustment) may vary as a function of the predetermined number of incremental adjustments. For example, as illustrated in FIG. 6, the maximum number of adjustments may be limited to 10. Thus, if the required adjustment is from halftone level 100 to halftone level 110, then the predetermined maximum delta with each adjustment in the series will be limited to one level. However, as illustrated in FIG. 7, if the maximum number of adjustments is limited to 10 and if the required adjustment is from halftone level 100 to halftone level 120, then the predetermined maximum delta with each adjustment in the series will be limited to two levels.

Referring again to FIG. 8, the processes 804-808, as discussed in detail above, can be repeated for a target value for a color (i.e., a target tone value) periodically over time to compensate for tone reproduction curve drift. Specifically, these processes can be repeated according to a predetermined schedule and/or on-demand. It should be understood that, while the embodiments are described above with reference to updating a single digital input value for a single target value for a color in the LUT, all LUT elements should be updated accordingly. However, it should further be understood that different update rates may be applied to different elements (e.g., mid patches may be updated slower than solids, etc.). The specific choice of function would be dependent on the specific goals and system behavior.

Also disclosed herein are embodiments of a computer program product. This computer program product can comprise a computer-usable (i.e., computer-readable) medium on which a computer-useable (i.e., computer-readable) program code (i.e., a control program, a set of executable instructions, etc.) is recorded and stored or embodied. Specifically, the computer-useable medium can comprise a tangible, non-transitory, storage medium (i.e., a memory device) on which the program is recorded and stored. Exemplary forms of such a tangible, non-transitory, storage medium include, but are not limited to, a magnetic storage medium (e.g., a floppy disk, a flexible disk, a hard disk, a magnetic tape or any other magnetic storage medium), an optical storage medium (e.g., a CD-ROM, DVD or any other optical storage medium), or a memory chip or cartridge (e.g., a RAM, a PROM, an EPROM, a FLASH-EPROM, or any other memory chip or cartridge). Alternatively, the computer-useable medium can comprise a transmission medium in which the program is embodied as a data signal. Exemplary forms of a transmission medium include, but are not limited to, an acoustic wave generated during radio wave communication, a light wave generated during infrared data communication or any other transmission medium from which a computer can read and use program code. The computer-usable program code can be read and executed by a computer (e.g., by the controller 170 of FIG. 1) in order to perform the method for gradually adjusting a look-up table for a print engine in order to improve the regulation of color quality of printed images (e.g., as described above and illustrated in FIGS. 8-10).

Many computerized devices are discussed above. Computerized devices that include chip-based central processing units (CPU's), input/output devices (including graphic user interfaces (GUI), memories, comparators, processors, etc. are well-known and readily available devices produced by manufacturers such as Dell Computers, Round Rock Tex., USA and Apple Computer Co., Cupertino Calif., USA. Such computerized devices commonly include input/output devices, power supplies, processors, electronic storage memories, wiring, etc., the details of which are omitted form this specification to allow the reader to focus on the salient aspects of the embodiments described herein. Similarly, scanners and other similar peripheral equipment are available from Xerox Corporation, Norwalk, Conn., USA and the details of such devices are not discussed herein for purposes of brevity and reader focus.

The word "printer", "print engine" or "image output terminal" as used herein encompasses any apparatus, such as a digital copier, bookmaking machine, facsimile machine, multi-function machine, etc. which performs a print outputting function for any purpose. The details of printers, print engines, etc. are well-known by those ordinarily skilled in the art and are discussed in, for example, U.S. Pat. No. 6,032,004, the complete disclosure of which is fully incorporated herein by reference. The embodiments herein can encompass embodiments that print in color, monochrome, or handle color or monochrome image data. All foregoing embodiments are specifically applicable to electrostatographic and/or xerographic machines and/or processes.

It will be appreciated that the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims. The claims can encompass embodiments in hardware, software, and/or a combination thereof. Unless specifically defined in a specific claim itself, steps or components of the embodiments herein should not be implied or imported from any above example as limitations to any particular order, number, position, size, shape, angle, color, or material.

Therefore, disclosed above are embodiments of a system and a method for gradually adjusting a look-up table (LUT) for a print engine (i.e., for slewing the adjustments to a LUT) in order to improve the regulation of color quality of printed images. Specifically, the embodiments can update (i.e., adjust) an LUT for a print engine so that a target value for a particular color (e.g., a target tone value) is correlated in the LUT with an adjusted digital input value (e.g., an adjusted halftone dot area coverage amount) that corrects for a detected or predicted change in a tone reproduction curve following the generation and evaluation of a test image (i.e., a test patch). However, depending upon the size of the required adjustment, a series of relatively small incremental adjustments (as opposed to a single relatively large adjustment) can be made to the LUT table over a specified period of time (e.g., before the next test image is scheduled to be generated and evaluated). Each incremental adjustment in the series can be limited to a predetermined maximum delta in order to ensure that any LUT adjustments, which are made to the LUT following the generation and evaluation of one test image and before the generation and evaluation of the next test image for the same target value, are gradually and imperceptibly implemented (i.e., unnoticeable). Additionally, these adjustments can be made according to a predetermined schedule in order to avoid mid-image color corrections, mid-document color corrections, and/or mid-print job color corrections.

What is claimed is:

1. A method comprising:
   storing, in a data storage device, a look-up table representative of a tone reproduction curve for a print engine, said look-up table correlating target values for a color to be printed by said print engine with digital input values;
   generating, by said print engine and based on a selected digital input value, a test image having said color;
   determining, by a processor, a difference between an actual value of said color and a corresponding target value for said color, said corresponding target value being correlated in said look-up table with said selected digital input value; and
   updating, by said processor, said look-up table so that said corresponding target value for said color is correlated in said look-up table with an adjusted digital input value that corrects for said difference, said updating comprising making a series of incremental adjustments to said selected digital input value.

2. The method of claim 1, said making of said series of incremental adjustments being performed so as to ensure that any corrections to said look-up table required to achieve a desired value for said color are gradually and imperceptibly implemented.

3. The method of claim 1, said making of said series of incremental adjustments being performed according to a predetermined schedule in order to avoid at least one of mid-image color corrections, mid-document color corrections, and mid-print job color corrections.

4. The method of claim 1, said target values for said color comprising target tone values, said digital input values comprising halftone dot area coverage amounts and each adjustment in said series comprising a change of no more than a predetermined maximum halftone dot area coverage amount.

5. The method of claim 4, said series comprising a predetermined number of incremental adjustments and said predetermined maximum halftone dot area coverage amount being a function of said predetermined number of incremental adjustments.

6. A method comprising:
   storing, in a data storage device, a look-up table representative of a tone reproduction curve for a print engine, said look-up table correlating target values for a color to be printed by said print engine with digital input values;
   generating, by said print engine and based on a selected digital input value, a test image having said color;
   evaluating, by an optical sensor, said test image to determine an actual value of said color;
   determining, by a processor and based on said actual value, a predicted value for said color of a next test image to be printed by said print engine in response to said selected digital input value at a future time;
   determining, by said processor, a difference between said predicted value for said color and a corresponding target value for said color, said corresponding target value being correlated in said look-up table with said selected digital input value; and
   updating, by said processor, said look-up table so that said corresponding target value for said color is correlated in said look-up table with an adjusted input value that corrects for said difference, said updating comprising making a series of incremental adjustments to said selected digital input value.

7. The method of claim 6,
   further comprising storing, in said data storage device, historical information characterizing time-dependent changes in said tone reproduction curve, and
   said determining of said predicted value further comprising determining said predicted value based on said historical information.

8. The method of claim 6, said making of said series of said incremental adjustments being performed so as to ensure that any corrections to said look-up table required to achieve a desired value for said color are gradually and imperceptibly implemented.

9. The method of claim 6, said making of said series of said incremental adjustments being performed according to a predetermined schedule in order to avoid at least one of mid-image color corrections, mid-document color corrections, and mid-print job color corrections.

10. The method of claim 6, said target values for said color comprising target tone values, said digital input values comprising halftone dot area coverage amounts and each adjustment in said series comprising a change of no more than a predetermined maximum halftone dot area coverage amount.

11. The method of claim 10, said series comprising a predetermined number of incremental adjustments and said predetermined maximum halftone dot area coverage amount being a function of said predetermined number of incremental adjustments.

12. The method of claim 6, said optical sensor comprising any one of a spectrophotometer and a densitometer.

13. A system comprising:
   a print engine;
   a data storage device storing a look-up table representative of a print engine tone reproduction curve, said look-up table correlating target values for a color to be printed by said print engine with digital input values and said print engine generating, based on a selected digital input value from said look-up table, a test image having said color;
   an optical sensor evaluating said test image to determine an actual value of said color; and
   a processor determining a difference between said actual value of said color and a corresponding target value for said color as correlated in said look-up table with said selected digital input value,
   said processor further updating said look-up table so that said corresponding target value for said color is correlated in said look-up table with an adjusted input value that corrects for said difference, said updating comprising making a series of incremental adjustments to said selected digital input value.

14. The system of claim 13, said processor further making said series of incremental adjustments so as to ensure that any corrections to said look-up table required to achieve a desired value for said color are gradually and imperceptibly implemented.

15. The system of claim 13, said processor further making said series of incremental adjustments according to a predetermined schedule in order to avoid at least one of mid-image color corrections, mid-document color corrections, and mid-print job color corrections.

16. The system of claim 13, said target values for said color comprising target tone values, said digital input values comprising halftone dot area coverage amounts and each adjustment in said series comprising a change of no more than a predetermined maximum halftone dot area coverage amount.

17. The system of claim 16, said series comprising a predetermined number of incremental adjustments and said predetermined maximum halftone dot area coverage amount being a function of said predetermined number of incremental adjustments.

18. The system of claim 13, said optical sensor comprising one of a spectrophotometer and a densitometer.

19. A system comprising:
a print engine;
a data storage device storing a look-up table representative of a print engine tone reproduction curve, said look-up table correlating target values for a color to be printed by said print engine with digital input values and said print engine generating, based on a selected digital input value, a test image having said color;
an optical sensor evaluating said test image to determine an actual value of said color; and
a processor determining, based on said actual value of said color, a predicted value for said color of a next test image to be printed by said print engine in response to said selected digital input value at a future time,
said processor further determining a difference between said predicted value for said color and a corresponding target value for said color, said corresponding target value being correlated in said look-up table with said selected digital input value, and
said processor further updating said look-up table so that said corresponding target value for said color is correlated in said look-up table with an adjusted input value that corrects for said difference, said updating comprising making a series of incremental adjustments to said selected digital input value.

20. The system of claim 19,
said data storage device further storing historical information characterizing time-dependent changes in said tone reproduction curve, and
said processor further determining said predicted value for said color based on said historical information.

21. The system of claim 19, said processor further making said series of incremental adjustments so as to ensure that any corrections to said look-up table required to achieve a desired value for said color are gradually and imperceptibly implemented.

* * * * *